United States Patent
Kim et al.

(10) Patent No.: US 10,088,802 B2
(45) Date of Patent: Oct. 2, 2018

(54) METHOD AND APPARATUS FOR PROCESSING HOLOGRAPHIC IMAGE

(71) Applicant: SAMSUNG ELECTRONICS CO., LTD., Suwon-si (KR)

(72) Inventors: Yuntae Kim, Suwon-si (KR); Hojung Kim, Suwon-si (KR); Hongseok Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/185,141

(22) Filed: Jun. 17, 2016

(65) Prior Publication Data

US 2017/0038727 A1 Feb. 9, 2017

(30) Foreign Application Priority Data

Aug. 3, 2015 (KR) .................. 10-2015-0109573

(51) Int. Cl.
| | |
|---|---|
| *G03H 1/16* | (2006.01) |
| *G06T 9/00* | (2006.01) |
| *G03H 1/08* | (2006.01) |
| *G06T 3/40* | (2006.01) |
| *G06T 7/593* | (2017.01) |
| *G03H 1/22* | (2006.01) |

(52) U.S. Cl.
CPC ............. *G03H 1/0808* (2013.01); *G03H 1/16* (2013.01); *G06T 3/4007* (2013.01); *G06T 3/4076* (2013.01); *G06T 3/4084* (2013.01); *G06T 7/593* (2017.01); *G06T 9/00* (2013.01); *G03H 1/2294* (2013.01); *G03H 2001/0825* (2013.01); *G03H 2240/56* (2013.01); *G03H 2240/62* (2013.01); *G06T 2207/20056* (2013.01)

(58) Field of Classification Search
None
See application file for complete search history.

(56) References Cited

U.S. PATENT DOCUMENTS

| | | |
|---|---|---|
| 8,085,453 B2 | 12/2011 | Christmas et al. |
| 8,441,703 B2 | 5/2013 | Leister |
| 8,878,759 B2 | 11/2014 | Crossland et al. |
| 2010/0188719 A1 | 7/2010 | Leister |

(Continued)

FOREIGN PATENT DOCUMENTS

| | | |
|---|---|---|
| JP | 2014-211565 A | 11/2014 |
| WO | 2014/176827 A1 | 11/2014 |

OTHER PUBLICATIONS

Shimobaba et al. Simple and fast calculation algorithm for computer-generated hologram with wavefront recording plane, Optics Letters / vol. 34, No. 20 / Oct. 15, 2009.*

(Continued)

*Primary Examiner* — Kee M Tung
*Assistant Examiner* — Yanna Wu
(74) *Attorney, Agent, or Firm* — Sughrue Mion, PLLC

(57) ABSTRACT

A method and apparatus for generating a holographic image from a low resolution image transformed into a low resolution complex image that is interpolated into a high resolution image complex image. By transforming fewer pixels of the low resolution image, the amount of calculation may be reduced and the processing speed for generating the holographic image may be increased.

18 Claims, 12 Drawing Sheets

(56) References Cited

U.S. PATENT DOCUMENTS

2011/0126160 A1\* 5/2011 Han ................... H04N 13/0029
   715/848
2012/0188444 A1\* 7/2012 Choi ....................... G09G 5/02
   348/441
2013/0100241 A1   4/2013 Sato
2014/0022239 A1\* 1/2014 Ming ................... G03H 1/0808
   345/419

OTHER PUBLICATIONS

Kazanskly, et al., "Computer-aided design of diffractive optical elements", Optical Engineering, vol. 33, Issue No. 10, Oct. 1, 1994, 3156-3166, XP000474364.
Leseberg, et al., "Computer-generated holograms of 3-D objects composed of tilted planar segment", Applied Optics, vol. 27, Issue No. 14, Jul. 5, 1988, pp. 3020-3024, XP55313793.
Communication dated Nov. 8, 2016, issued by the European Patent Office in counterpart European Patent Application No. 16182542.7.

\* cited by examiner

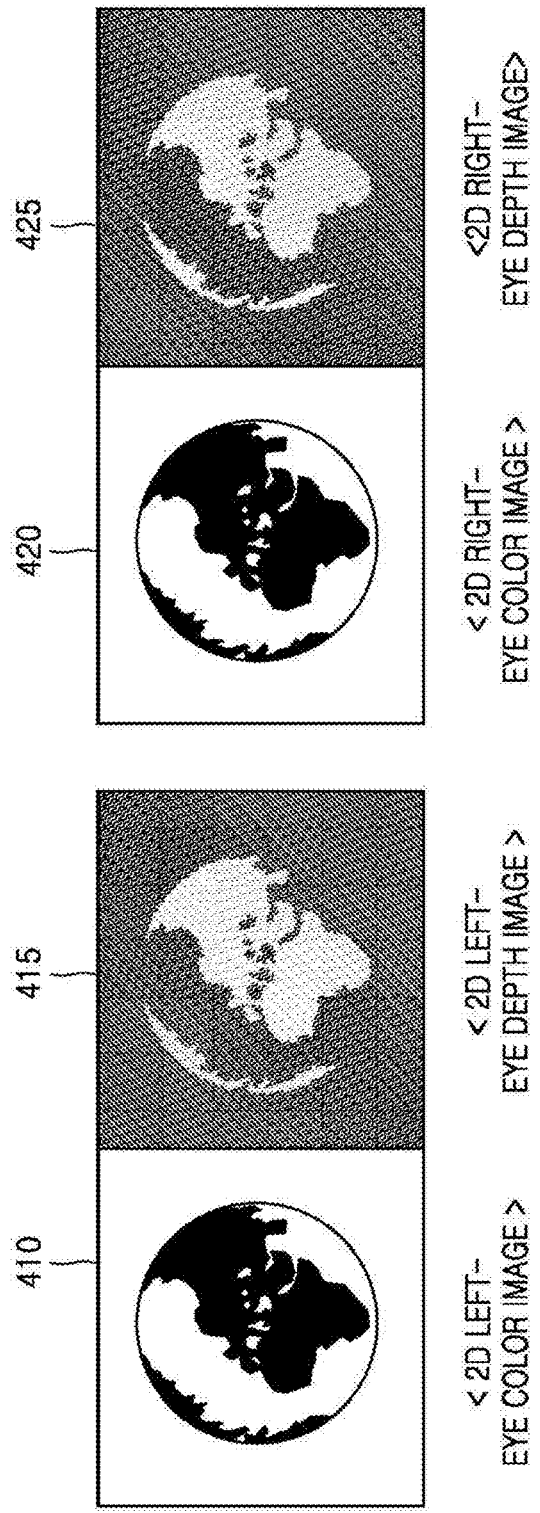

< 3D BOXEL DATA >

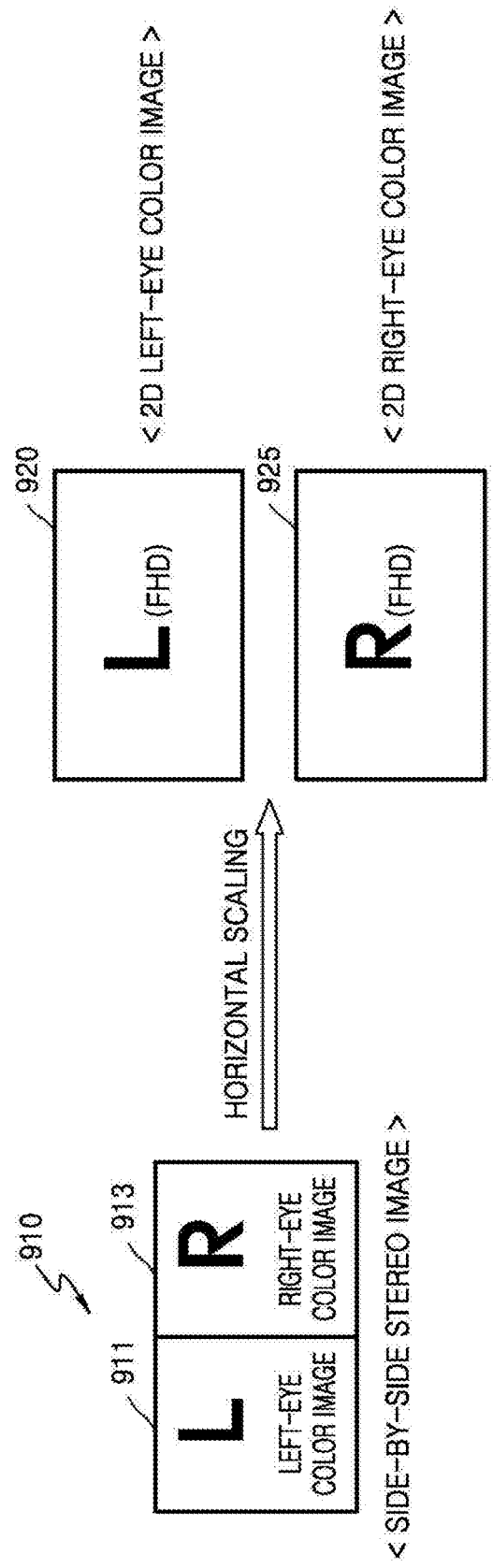

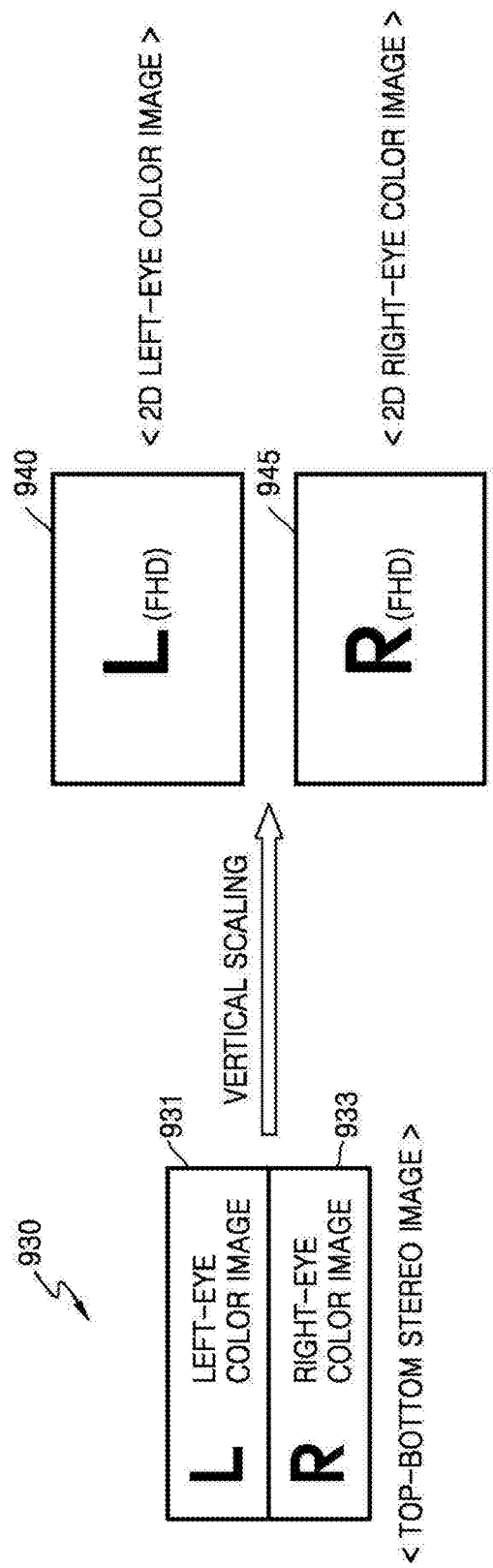

METHOD AND APPARATUS FOR PROCESSING HOLOGRAPHIC IMAGE

CROSS-REFERENCE TO RELATED APPLICATION

This application claims priority from Korean Patent Application No. 10-2015-0109573, filed on Aug. 3, 2015, in the Korean Intellectual Property Office, the disclosure of which is incorporated herein by reference in its entirety.

BACKGROUND

1. Field

Methods and apparatuses consistent with exemplary embodiments relate to processing a holographic image, and more particularly, to methods and apparatuses for generating a computer generated hologram (CGH) image from a low resolution image transformed into a low resolution complex image that is interpolated into a high resolution image complex image.

2. Description of the Related Art

Three-dimensional (3D) graphics technology necessitates generating a large number of stereoscopic images to display 3D video. However, a user may experience various problems, such as eye fatigue or the user's view may be restricted, when viewing a 3D video generated using the large number of 3D images.

To improve the user experience, 3D videos generated using a hologram have been recently highlighted. Specifically, holography is a technology of reproducing an object in 3D space by controlling the amplitude and phase of light. Holography does not restrict a user's view or cause eye fatigue, and therefore research has been actively conducted into technology for reproducing high resolution holograms in real-time by generating a digital hologram such as a computer generated hologram (CGH).

SUMMARY

Aspects of the exemplary embodiments relate to methods and apparatuses for processing holographic images.

Additional aspects will be set forth in part in the description which follows and, in part, will be apparent from the description, or may be learned by practice of the presented exemplary embodiments.

According to an aspect of an exemplary embodiment, there is provided a method of processing a holographic image, the method including: generating a first complex image corresponding to a first resolution by performing frequency transformation on input image data having the first resolution; scaling the first complex image having the first resolution to a second complex image having a second resolution; encoding complex values corresponding respectively to pixels of the second resolution in the second complex image that has been scaled, into integer values; and generating a computer generated hologram (CGH) image having the second resolution by using the encoded integer values.

The first resolution may be less than the second resolution.

The input image data may include color data and depth data of each of pixels in a left-eye two-dimensional (2D) image and a right-eye 2D image having the first resolution, and the generating of the first complex image may include generating the first complex image by performing frequency transformation of the color data and the depth data of each pixel into a complex value corresponding to each pixel.

The frequency transformation may include generalized Fresnel transformation (GFT), and the generating of the first complex image may include performing fast Fourier transformation (FFT) on each of the pixels in at least one input image having the first resolution.

The scaling of the first complex image may include up-scaling the first complex image of the first resolution to the second complex image of the second resolution by performing interpolation.

The scaling of the first complex image may include: separating the first complex image into a first real image and a first imaginary image corresponding to the first resolution; generating a second real image and a second imaginary image corresponding to the second resolution by performing the interpolation respectively on the first real image and the first imaginary image; and generating the second complex image by synthesizing the second real image and the second imaginary image with each other.

The encoding may include encoding the complex values into 8-bit unsigned integer values.

When an input image is a stereo image of a side-by-side format or a top-bottom format having the second resolution, the method may further include pre-processing the stereo image into a left-eye 2D image and a right-eye 2D image of the first resolution, and the input image data may include color data and depth data of pixels in the pre-processed left-eye 2D image and the pre-processed right-eye 2D image of the first resolution.

When an input image has a third resolution that is greater than the first resolution, the method may further include down-scaling the input image having the third resolution into the first resolution, and the input image data may include color data and depth data of pixels in the down-scaled input image.

According to an aspect of an exemplary embodiment, there is provided a non-transitory computer-readable recording medium having recorded thereon a program, which when executed by a computer, performs the method.

According to an aspect of an exemplary embodiment, there is provided an apparatus for processing a holographic image, the apparatus including: a frequency transforming operator configured to generate a first complex image corresponding to a first resolution by performing frequency transformation on input image data having the first resolution; a scaling operator configured to scale the first complex image having the first resolution to a second complex image having a second resolution; an encoder configured to encode complex values respectively corresponding to pixels of the second resolution in the scaled second complex image, into integer values; and a computer generated hologram (CGH) image generator configured to generate a CGH image having the second resolution by using the encoded integer values.

The first resolution may be less than the second resolution.

The input image data may include color data and depth data of pixels in a left-eye two-dimensional (2D) image and a right-eye 2D image having the first resolution, and the frequency transforming operator may generate the first complex image by performing the frequency transformation on the color data and the depth data of the pixels into complex values corresponding to the pixels.

The frequency transformation may include generalized Fresnel transformation, and the frequency transforming operator may generate the first complex image by performing fast Fourier transformation (FFT) on each of pixels in at least one input image having the first resolution.

The scaling operator may up-scale the first complex image of the first resolution to the second complex image of the second resolution by performing interpolation.

The scaling operator may separate the first complex image into a first real image and a first imaginary image corresponding to the first resolution, generate a second real image and a second imaginary image corresponding to the second resolution by performing the interpolation on each of the first real image and the first imaginary image, and generate the second complex image by synthesizing the second real image and the second imaginary image.

The encoder may encode the complex values into 8-bit unsigned integer values.

When an input image is a stereo image of a side-by-side format or a top-bottom format having the second resolution, the scaling operator may pre-process the stereo image into a left-eye 2D image and a right-eye 2D image of the first resolution, and the input image data may include color data and depth data of pixels in the pre-processed left-eye 2D image and the pre-processed right-eye 2D image of the first resolution.

When an input image has a third resolution that is greater than the first resolution, the scaling operator may down-scale the input image having the third resolution into the first resolution, and the input image data may include color data and depth data of pixels in the down-scaled input image.

The third resolution may be equal to the second resolution.

BRIEF DESCRIPTION OF THE DRAWINGS

The above and other aspects will become apparent and more readily appreciated from the following description of the exemplary embodiments, taken in conjunction with the accompanying drawings in which:

FIG. 4A is a diagram illustrating an input image according to an exemplary embodiment;

FIGS. 9A and 9B are diagrams illustrating scaling a stereo image, according to another exemplary embodiment;

DETAILED DESCRIPTION OF EXEMPLARY EMBODIMENTS

The terms used herein are selected from widely used general terms in consideration of the functions of the subject matter of the present disclosure. However, the terms may vary according to the intention of one of ordinary skill in the art, case precedents, and the advent of new technologies. Also, in special cases, the meanings of the terms selected are described below. Accordingly, the terms used herein are defined based on their meanings in relation to the contents discussed throughout the specification.

In the present specification, when a constituent element "connects" or is "connected" to another constituent element, the constituent element may contact or be connected to the other constituent element not only directly, but also electrically through at least one of other constituent elements interposed therebetween. Also, when a part "includes" a certain constituent element, unless specified otherwise, it may not be construed to exclude another constituent element but may be construed to further include other constituent elements. Terms such as " . . . unit", "~module", etc. stated in the specification may signify a unit for processing at least one function or operation and the unit may be embodied by hardware, software, or a combination of hardware and software.

Terms such as "include" or "comprise" may not be construed to necessarily include any and all constituent elements or steps described in the specification, but may be construed to exclude some of the constituent elements or steps or further include additional constituent elements or steps.

Also, terms such as "first" and "second" are used herein merely to describe a variety of constituent elements, but the constituent elements are not limited by the terms. Such terms are used only for the purpose of distinguishing one constituent element from another constituent element.

The attached drawings are referred to to gain a sufficient understanding of the present disclosure, the merits thereof, and the objectives accomplished by the implementation concepts herein.

As used herein, the term "and/or" includes any and all combinations of one or more of the associated listed items. Expressions such as "at least one of," when preceding a list of elements, modify the entire list of elements and do not modify the individual elements of the list.

Figure 1:
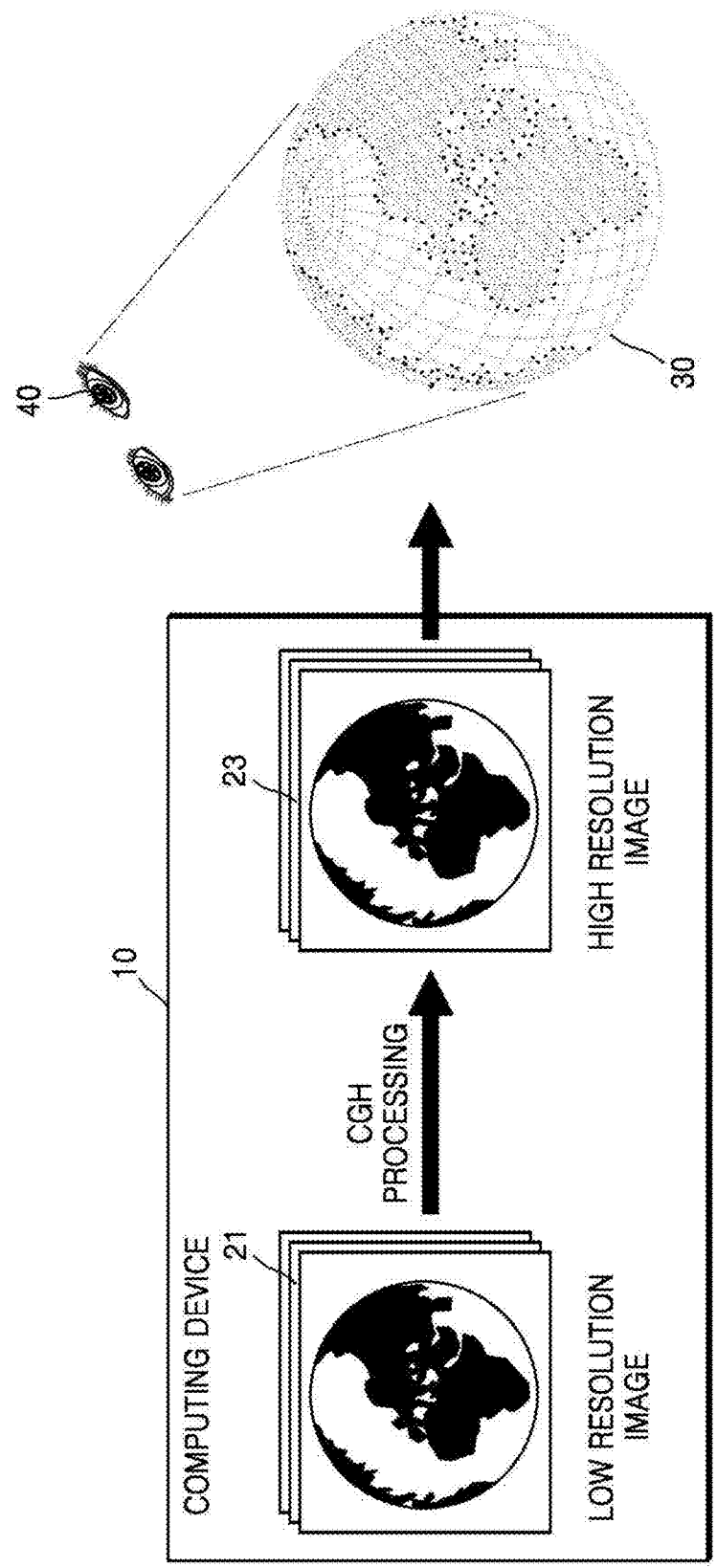
FIG. 1 is a diagram describing the display of a holographic image using a computing device, according to an exemplary embodiment.

FIG. 1 is a diagram describing the display of a holographic image using a computing device, according to an exemplary embodiment.

Referring to FIG. 1, the computing device 10 generates a computer generated hologram (CGH) image 23 by performing CGH processing on an input image 21. The computing device 10 may display the generated CGH image 23 as a holographic image 30 that a user 40 may visualize in three-dimensional (3D) space. The computing device 10 may alternately output the generated CGH image 23 to another external device, which outputs the holographic image 30. The CGH processing may include a series of processes that are performed for generating the CGH image 23 by the computing device 10. In addition, the holographic image 30 may include a still image, or a video reproduced as a hologram.

A hologram is a 3D space representing technology that reproduces an object in a 3D space by adjusting the amplitude and phase of light. Accordingly, a user may have an unrestricted view of the holographic output and may not experience conventional visual fatigue associated with 3D image viewing. A holographic image may be displayed in 3D space using an interference pattern between an object wave and a reference wave. CGH technology providing a hologram on a flat panel display by processing an interference pattern for reproducing a holographic video may be utilized.

CGH technology generates a hologram by approximating optical signals and computing an interference pattern generated by mathematical calculation. Because a 3D object consists of a set of 3D points, the method of generating a digital hologram calculates point holograms, which respectively correspond to all 3D points composing a 3D object, to represent a complete hologram.

The computing device 10 transforms the input image 21 of low resolution into a CGH image 23 of high resolution to display the holographic image 30 of high resolution. The holographic image 30 may include a plane (two-dimensional (2D)) hologram and a volume (3D) hologram. Hereinafter, for convenience of description, it will be assumed that low resolution is full high definition (FHD) having a resolution of 1920×1080 pixels and high resolution is ultra HD (UHD) having a resolution of 3840×2160 pixels. However, the exemplary embodiments are not limited thereto. For example, the low resolution image may be an HD image and the high resolution may be an FHD image, or the low resolution may be an HD image and the high resolution image may be a UHD image.

Transformation of the input image 21 of low resolution into the CGH image 23 of high resolution may be performed by CGH processing including various calculations. The CGH processing may include fast Fourier transformation (FFT) for calculating each point hologram in a 3D space. A main cause that mostly affects an amount of computation or a computation speed for performing CGH processing may be the FFT. In CGH processing, FFT is performed on each pixel. Therefore, the higher the resolution, the greater processing that is expended to perform FFT. Therefore, an amount of computation for CGH processing increases and a computation speed reduces, as resolution of an input image to be processed increases. Therefore, when FFT is more effectively performed, CGH processing may be more efficiently completed if the number of pixels to be processed is decreased, for example through down sampling.

Hereinafter, the computing device 10 according to one or more exemplary embodiments may perform the CGH processing for converting the low resolution input image 21 into the high resolution CGH image 23. The CGH processing will be described in detail below.

Figure 2:
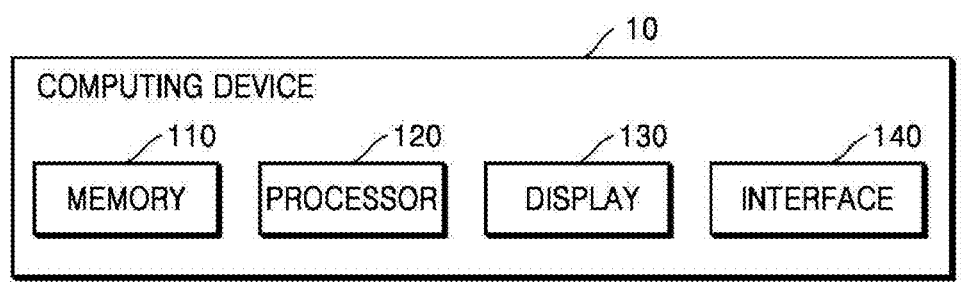
FIG. 2 is a block diagram of a computing device according to an exemplary embodiment.

FIG. 2 is a block diagram of A computing device according to an exemplary embodiment.

Referring to FIG. 2, the computing device 10 may include a memory 110, a processor 120, a display 130, and an interface 140. In FIG. 2, only elements that are related to one or more exemplary embodiments are shown in the computing device 10. Therefore, one of ordinary skill in the art would appreciate elements other than the elements shown in FIG. 2 may be further included in the computing device 10.

The computing device 10 may be, for example, a desktop computer, a notebook computer, a smartphone, a personal digital assistant (PDA), a portable media player, a video game console, a television set-top box, a tablet device, an electronic-book reader, a wearable device, etc., but the computing device 10 is not limited thereto.

The processor 120 is hardware circuitry for controlling overall operations and functions of the computing device 10. For example, the processor 120 may execute an operating system (OS), a graphics application programming interface (API) for performing the CGH processing, and a graphics driver for displaying holographic images. In addition, the processor 120 may execute various applications stored in the memory 110, e.g., a hologram reproducing application, a Web browsing application, a game application, a video application, etc.

Meanwhile, the processor 120 may perform CGH processing for transforming the low resolution input image 21 into the high resolution CGH image 23, as described above. The processor 120 may be implemented as one or more of a central processing unit (CPU), microprocessor, a graphic processing unit (GPU), an application processor (AP), etc.

The memory 110 is hardware circuitry for storing various data processed by the processor 120 of the computing device 10. The memory 110 may store data that has been processed by the processor 120 and data to be processed by the processor 120, or may store data received via the interface 140. For example, the memory 110 may store the low resolution input image 21 and the high resolution CGH image 23 obtained from the low resolution input image 21. In addition, the memory 110 may store metadata about the low resolution input image 21, such as color values, coordinate values, depth values, etc. of pixels in the input image 21, for allowing the processor 120 to perform the CGH processing, and may store results of generalized Fresnel transformation (GFT), which includes results of FFT and additional kernel operations, computed by performing CGH processing.

The memory 110 may include one or more of a random access memory (RAM) such as a dynamic RAM (DRAM) and a static RAM (SRAM), a read-only memory (ROM), an electrically erasable programmable ROM (EEPROM), a compact-disc (CD)-ROM, a Blu-ray or other optical disc storages, a hard disk drive (HDD), a solid state drive (SSD), or a flash memory, and moreover, other external storage devices that may store data of the computing device 10.

The display 130 is hardware for displaying the holographic image 30 in 3D space based on the CGH image 23. The display 130 may include a holographic module for the hologram such as an SLM, and may include various kinds of display panels such as a liquid crystal display (LCD), an organic light-emitting diode (OLED), etc. That is, the display 130 may include various modules and configurations for displaying the holographic image 30.

The interface 140 may be implemented as hardware of wired or wireless interfaces for enabling the computing device 10 to communicate with other external devices. The interface 140 may be a wired or wireless network interface that receives the input image 21 to be transformed into the CGH image 23 from, for example, an external server, other devices, etc. In addition, the interface 140 may transmit data about the CGH image 23 to the external server, other devices, etc. so that the holographic image 30 may be displayed or reproduced on other devices.

Figure 3:
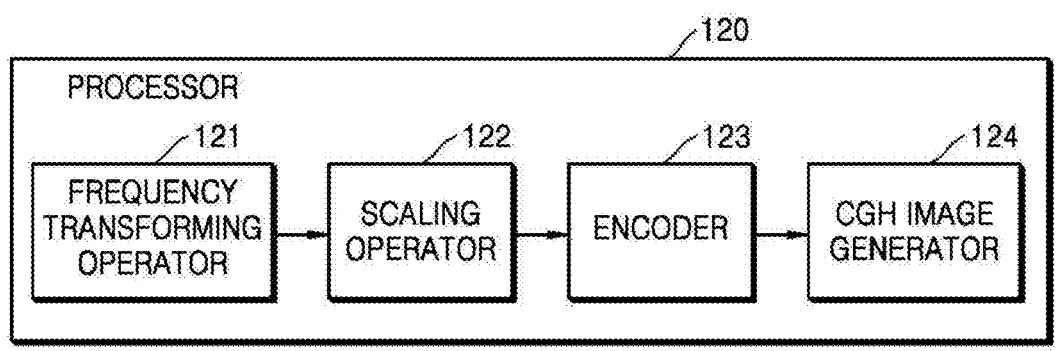
FIG. 3 is a block diagram of a detailed hardware configuration of a computing device processor according to an exemplary embodiment.

FIG. 3 is a block diagram of a detailed hardware configuration of a computing device processor according to an exemplary embodiment.

Referring to FIG. 3, the processor 120 may include a frequency transforming operator 121, a scaling operator 122, an encoder 123, and a CGH image generator 124. In FIG. 3, only the elements of the processor 120 related to one or more exemplary embodiments are shown for convenience of description, and thus, the processor 120 may further include elements other than the elements shown in FIG. 3. The frequency transforming operator 121, the scaling operator 122, the encoder 123, and the CGH image generator 124 are distinguished by separate names according to functions thereof. The frequency transforming operator 121, the scaling operator 122, the encoder 123, and the CGH image generator 124 may be implemented as one processor 120. Otherwise, each of the frequency transforming operator 121, the scaling operator 122, the encoder 123, and the CGH image generator 124 may correspond to one or more processing modules (or sub-processors) in the processor 120. Alternatively, the frequency transforming operator 121, the scaling operator 122, the encoder 123, and the CGH image generator 124 may correspond to software functions classified according to functions thereof. That is, an implementation form of the frequency transforming operator 121, the scaling operator 122, the encoder 123, and the CGH image generator 124 in the processor 120 is not limited to a certain example.

The frequency transforming operator 121 performs frequency transformation on input image data, for example of low resolution (e.g., FHD), to generate a low resolution complex image. The complex image is an image having a real component and an imaginary component, which is a result of performing FFT on the input image data, as discussed below. The input image data may include data of a 2D left-eye image and a 2D right-eye image, 3D boxel data, 3D polygon data, etc.

FIG. 4A is a diagram illustrating an input image according to an exemplary embodiment.

Referring to FIG. 4A, the input image may correspond to a 2D left-eye color image 410, a 2D left-eye depth image 415, a 2D right-eye color image 420, and a 2D right-eye depth image 425. The 2D left-eye color image 410 and the 2D right-eye color image 420 may be images using binocular parallax for reproducing a general 3D image. The 2D left-eye depth image 415 and the 2D right-eye depth image 425 may be difference images between the 2D left-eye color image 410 and the 2D right-eye color image 420.

Figure 4B:
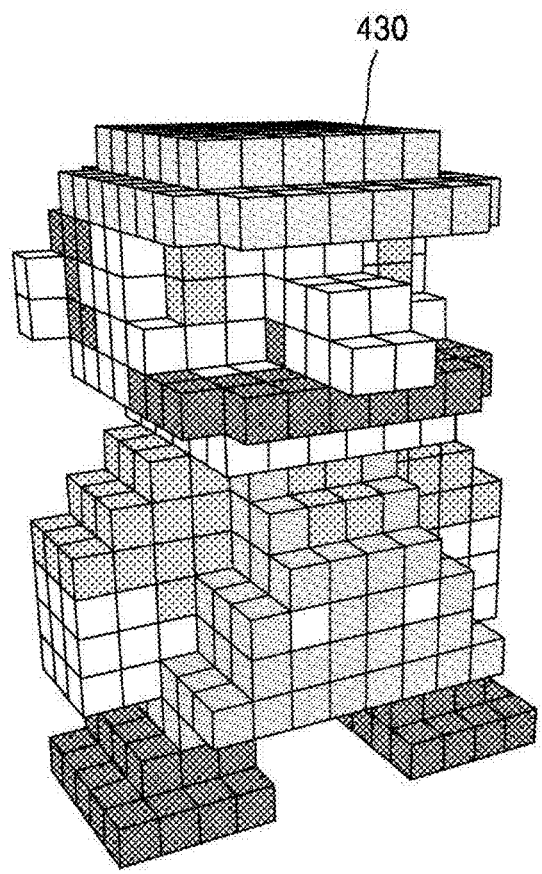
FIG. 4B is a diagram illustrating an input image according to an exemplary embodiment.

FIG. 4B is a diagram illustrating an input image according to an exemplary embodiment.

Referring to FIG. 4B, the input image may correspond to 3D boxel data 430. The 3D boxel data 430 may include data about coordinates, color values, etc., of boxels configuring a 3D object.

The input image data, is not limited to a certain kind, such as the left-eye image and right-eye image of FIG. 4A and the boxel data of FIG. 4B, but may vary. However, in the present exemplary embodiments, it is assumed that the input image includes 2D left-eye and right-eye images, for convenience of description.

Referring back to FIG. 3, the frequency transforming operator 121 performs GFT by using at least one of coordinate data (x,y data), RGB color data, and depth data (z-axis coordinate data) for each of pixels included in the 2D left-eye and right-eye images of low resolution (e.g., FHD). The GFT or Fresnel transformation is a conventional computation for obtaining distribution of diffracted images that are obtained through Fresnel diffraction of an image.

The frequency transforming operator 121 performs FFT on each of the pixels included in the input image to obtain a complex value corresponding to each pixel, during the GFT. The complex value corresponding to each pixel may include information about an amplitude and phase with respect to a Fresnel diffraction pattern, that is a result of GFT. The frequency transforming operator 121 may generate a complex image based on the complex value corresponding to each pixel. That is, the frequency transforming operator 121 may generate the low resolution complex image by using the low resolution (e.g., FHD) 2D left-eye and right-eye images. The frequency transforming operator 121 may store the complex image in the memory 110. The complex image may be stored in the memory 110 as real component image data in a first area of the memory 110 and imaginary component image data in a second area of the memory 110.

The scaling operator 122 scales the low resolution complex image into a high resolution (e.g., UHD) complex image. In detail, the scaling operator 122 performs interpolation on the low resolution complex image to up-scale the low resolution complex image to a high resolution complex image. The up-scaling of the complex image may include performing interpolation on a real component and an imaginary component of the complex value corresponding to each pixel. Here, to perform the up-scaling, nearest-neighbor interpolation, bilinear interpolation, bicubic interpolation, etc. may be used.

As described in the above example, when the low resolution complex image has a resolution of 1920×1080 and the high resolution complex image has a resolution of 3840× 2160, the scaling operator 122 may perform 2× up-scaling.

In the above description, it is described that the largest proportion of load in CGH processing is FFT. Because the FFT is performed on each of the pixels during the CGH processing, the amount of computation increases and the computation speed decreases as the resolution of the input image data increases. According to the present exemplary embodiment, up-scaling is performed after performing FFT on the pixels of the low resolution (e.g., 1920×1080). Therefore, even when the processor 120 finally generates the image of high resolution (e.g., 3840×2160), FFT may not be performed on all the pixels of high resolution image data, but instead FFT may be performed on pixels of low resolution image data. Therefore, the amount of calculation may be reduced and the processing speed may be increased. That is, in comparison to processing in which up-scaling from the low resolution (e.g., 1920×1080) image data to the high resolution (e.g., 3840×2160) image data is performed and then the FFT is performed with respect to the pixels of the high resolution (e.g., 3840×2160) image data, the present exemplary embodiment may reduce the amount of calculation to improve the calculation speed by at least a factor of two.

The scaling will be described in more detail as follows. The scaling operator 122 separates the complex image of low resolution into a real image and an imaginary image of low resolution. For example, the scaling operator 122 may read real component data of the complex image from memory 110 to obtain the real image, and read imaginary component data of the complex image from memory 110 to obtain the complex image. Subsequently, the scaling operator 122 performs interpolation on each of the real image data of the real image and imaginary image data of the imaginary image of low resolution complex image to generate a real image and an imaginary image corresponding to a complex image of high resolution. The scaling operator 122 synthesizes the real image and the imaginary image of high resolution with each other to generate the complex of high resolution. The synthesized real image and imaginary image may be stored in the memory 110 as the high resolution complex image.

The encoder 123 encodes the complex values of pixels of the high resolution complex image into integer values. For example, the encoder 123 may encode the complex values of the complex image into 8-bit unsigned integer values.

The CGH image generator 124 generates a CGH image of high resolution (e.g., UHD) by using the encoded integer values. When the process 120 performs the CGH processing as described above, the input image 21 (see FIG. 1) of the low resolution may be transformed into the CGH image 23 (see FIG. 1). Here, the CGH image may be output when a complex SLM controls a phase value of each pixel and an amplitude SLM controls a transmittance of each pixel based on the complex values. Amplitudes or phases for the SLM are calculated from the encoded integer values, then the calculated amplitudes are used for a phase control of the amplitude SLM and the calculated phases are used for a transmittance control of the complex SLM. Therefore, the encoded integer values may be used to control the complex SLM and the amplitude SLM for outputting the CGH image.

Figure 5:
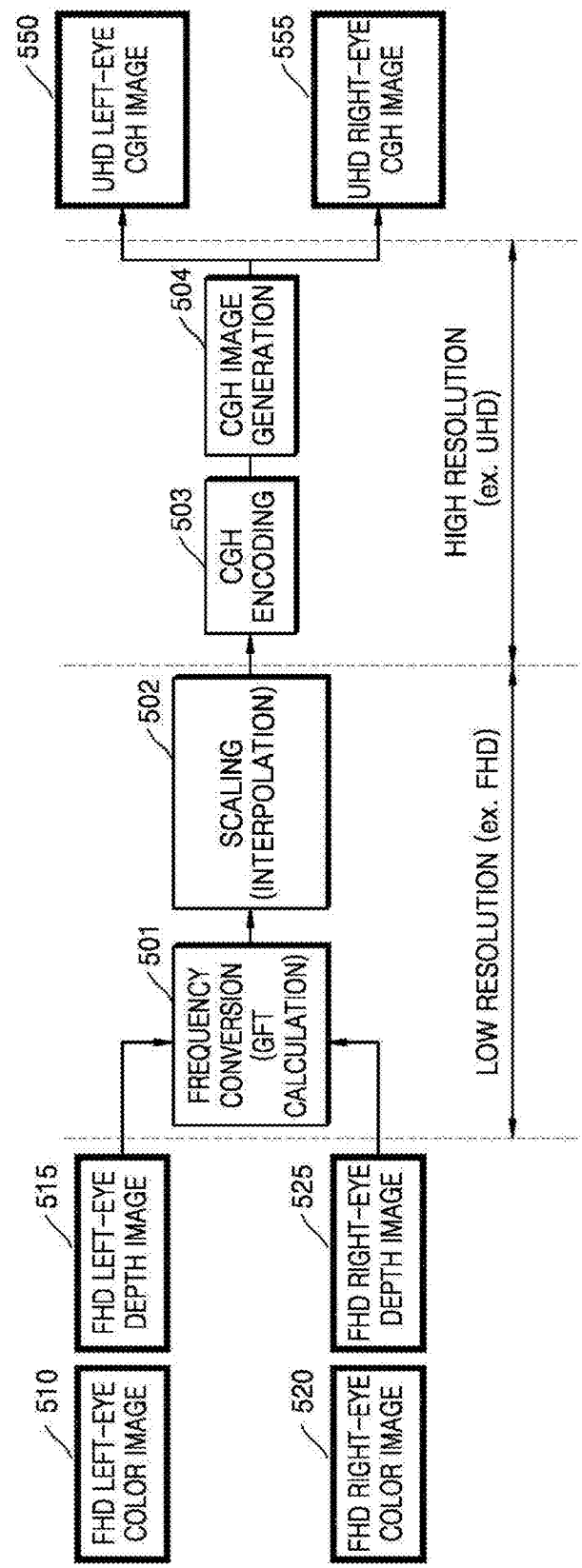
FIG. 5 is a flow diagram illustrating computer generated hologram (CGH) processing for generating a CGH image, according to an exemplary embodiment.

FIG. 5 is a flow diagram for describing the CGH processing for generating the CGH image, according to the exemplary embodiment.

In operation 501, the frequency transforming operator 121 obtains an FHD left-eye color image 510, an FHD left-eye depth image 515, an FHD right-eye color image 520, and an FHD right-eye depth image 525, and obtains RGB color data and depth data about each of pixels from the above images 510, 515, 520, and 525. Although it is assumed that 2D images are used in the exemplary embodiments for convenience of description, 3D boxel data may be used, as described above.

The frequency transforming operator 121 performs GFT on each pixel. In particular, the frequency transforming operator 121 may perform the FFT by using a pixel value (e.g., a color value, a depth value, etc.) of each pixel as an input to FFT processing. As a result, the frequency transforming operator 121 obtains complex values corresponding to the pixels, and may generate a complex image of FHD resolution based on the obtained complex values. Because the frequency transforming operator 121 obtains the image of FHD resolution, the FFT is performed for each of pixels in FHD resolution.

In operation 502, the scaling operator 122 up-scales the complex image of FHD resolution to a complex image corresponding to UHD resolution (3840×2160). Because UHD resolution is two times greater than FHD resolution, the scaling operator 122 may perform 2× up-scaling. The scaling operator 122 obtains the complex value corresponding to each of the pixels of the UHD resolution by interpolating the complex value corresponding to each of the pixels in the FHD resolution, and generates the complex image of UHD resolution. Here, interpolating of the complex value may be different from the interpolating of a regular (real) value such that the real component and the imaginary component of the complex value are separately stored, the real component and the imaginary component are respectively interpolated, and the interpolated results for the real component and the imaginary component are gathered and stored in a single memory area together.

Until the up-scaling in operation 502 is complete, the processor 120 continues to perform the computation on the pixels of the low resolution image data. As noted above, if an order of operation 501 and operation 502 is inverted (that is, if operation 501 is performed after performing operation 502), the frequency transforming operator 121 processes pixels that have been up-scaled to the UHD resolution by the scaling operator 122. Thus, in this case, the frequency transforming operator 121 performs FFT on twice as many pixels (3840×2160). Accordingly, an amount of computation is unnecessarily large, and the CGH processing becomes inefficient.

In operation 503, the encoder 123 encodes the complex values corresponding to the pixels in the complex image of UHD resolution to 8-bit unsigned integer values corresponding to the pixels.

In operation 504, the CGH image generator 124 generates a UHD left-eye CGH image 550 and a UHD right-eye CGH image 555 based on an encoding result of operation 503.

In addition, the display 130 (see FIG. 2) may display the holographic image 30 (see FIG. 1) in 3D space by using the UHD left-eye CGH image 550 and the UHD right-eye CGH image 555.

Figure 6:
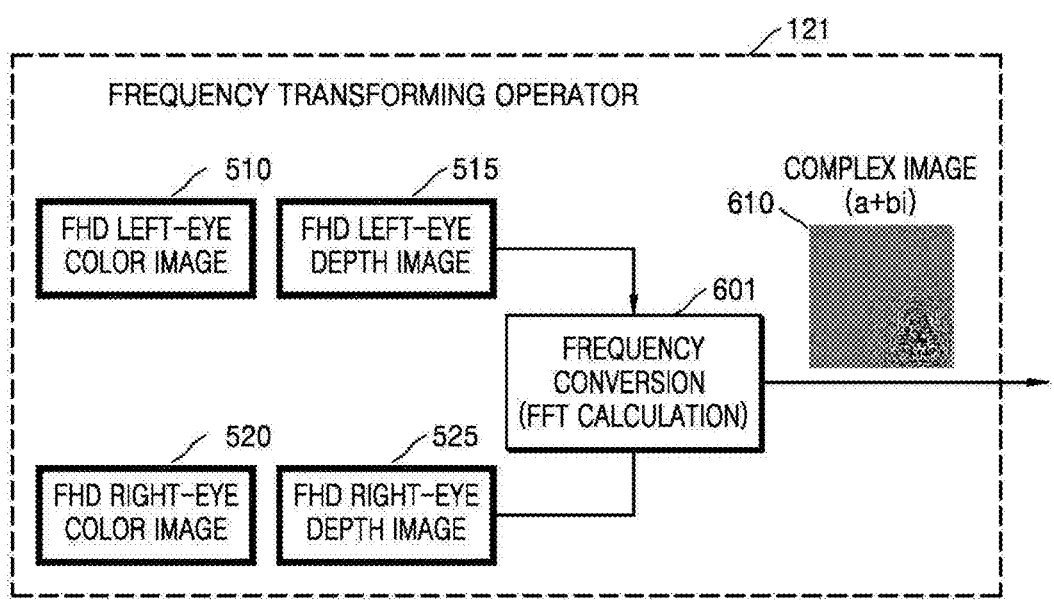
FIG. 6 is a diagram describing frequency transformation performed by a frequency transforming operator, according to an exemplary embodiment.

FIG. 6 is a diagram describing frequency transformation performed by the frequency transforming operator, according to an exemplary embodiment.

Referring to FIG. 6, the frequency transforming operator 121 obtains an FHD left-eye color image 510, an FHD left-eye depth image 515, an FHD right-eye color image 520, and an FHD right-eye depth image 525 stored in the memory 110 (see FIG. 2). The frequency transforming operator 121 may obtain RGB color data and depth data about each of the pixels in the above images 510, 515, 520, and 525 from the memory 110 (see FIG. 2), as well as the above images 510, 515, 520, and 525 themselves. If 3D boxel data is used as input image data, the frequency transforming operator 121 may use RGB color data and depth data about each of the boxels.

The frequency transforming operator 121 performs frequency transformation 601 on each pixel of the FHD resolution (e.g., 1920×1080). The frequency transformation 601 may be GFT, and during the frequency transformation 601, FFT, in particular, may be performed. As a result of the frequency transformation 601, complex values corresponding to the pixels may be obtained. Because GFT has been performed, the complex value corresponding to each pixel may represent information about an amplitude and phase with respect to a Fresnel diffraction pattern. The frequency transforming operator 121 may generate a complex image 610 of FHD resolution, based on the complex values corresponding to the pixels.

Figure 7:
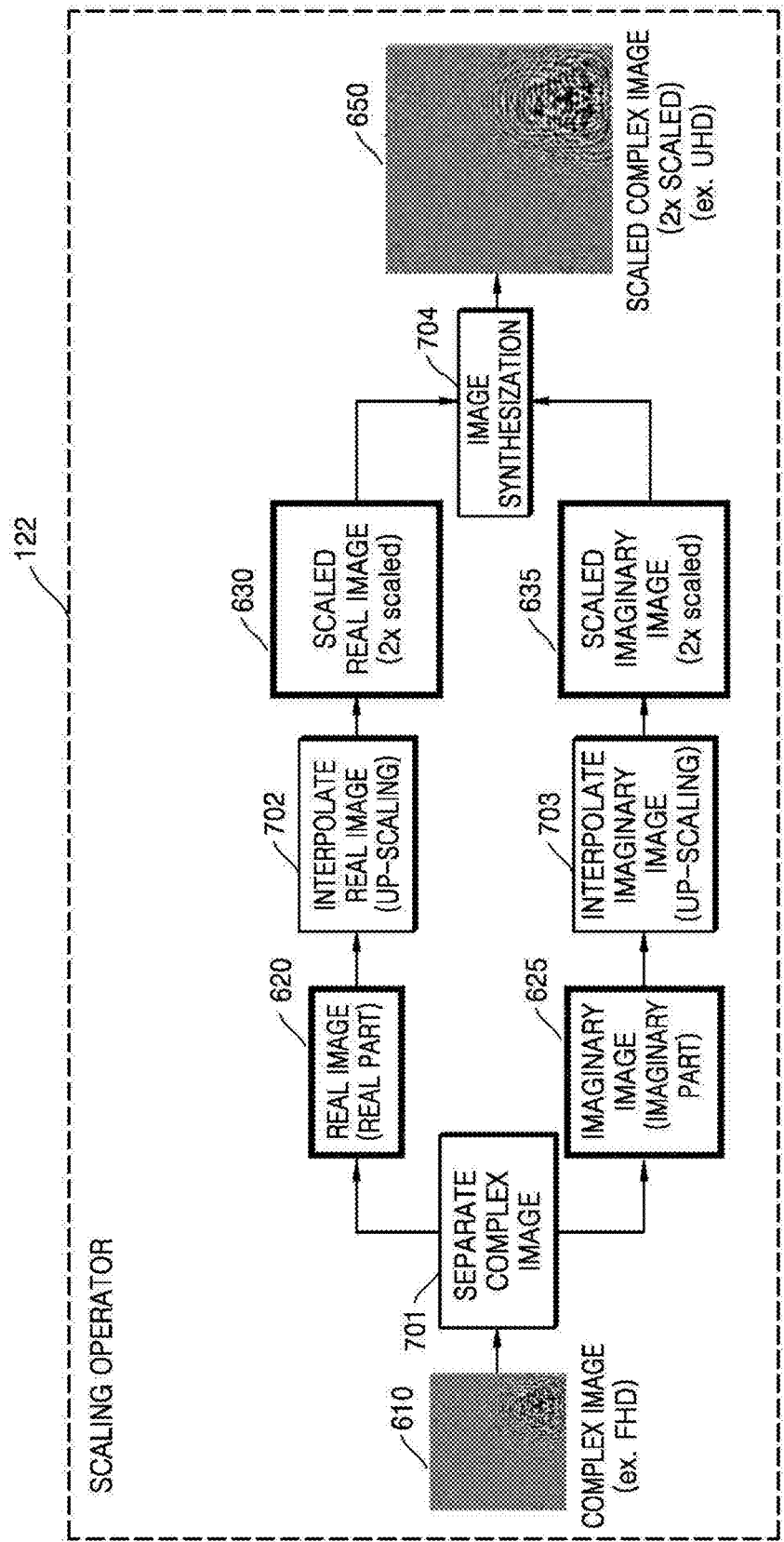
FIG. 7 is a diagram describing a scaling operation performed by a scaling operator, according to an exemplary embodiment.

FIG. 7 is a diagram describing a scaling operation performed by the scaling operator, according to an exemplary embodiment.

Referring to FIG. 7, the scaling operator 122 scales the complex image 610 of FHD resolution shown in FIG. 6.

In operation 701, the scaling operator 122 separates the complex image 610 into a real image 620 and an imaginary image 625 of FHD resolution. That is, the scaling operator 122 separates the complex values corresponding to the pixels in the complex image 610 into real values in a real part and imaginary values in an imaginary part. The complex values may correspond to the complex image 610, the real values may correspond to the real image 620, and the imaginary values may correspond to the imaginary image 625.

In operation 702, the scaling operator 122 performs interpolation on the real image 620 of FHD resolution to up-scale the real image 620 to a real image 630 of UHD resolution (2× up-scaling).

In operation 703, the scaling operator 122 performs interpolation on the imaginary image 625 of FHD resolution to up-scale the imaginary image 625 to an imaginary image 635 of UHD resolution (2× up-scaling). In the present exemplary embodiment, operation 703 is performed after performing operation 702, but an order of operation 702 and operation 703 may be inverted.

In operation 704, the scaling operator 122 synthesizes the real image 630 of UHD resolution with the imaginary image 635 of UHD resolution to generate an up-scaled complex image 650 of UHD resolution (3840×2160). Here, the generation of the complex image 650 may include obtaining complex values corresponding to pixels of UHD resolution (3840×2160).

Figure 8:
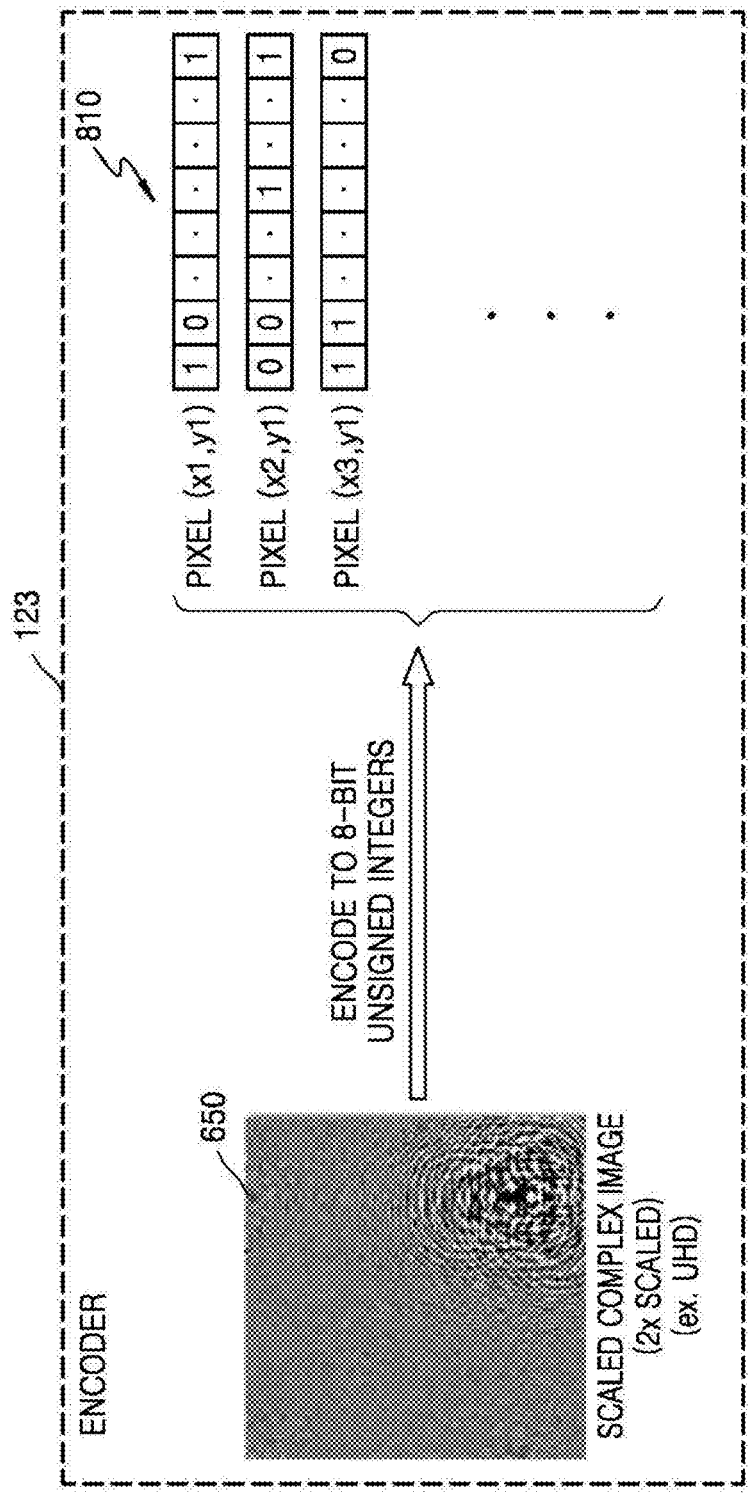
FIG. 8 is a diagram for describing encoding performed by an encoder, according to an exemplary embodiment.

FIG. 8 is a diagram for describing encoding performed by the encoder according to the exemplary embodiment.

Referring to FIG. 8, the encoder 123 uses the complex image 650 of UHD resolution shown in FIG. 7.

The encoder 123 encodes the complex values corresponding to the pixels of the complex image 650 of UHD resolution into 8-bit unsigned integers 810. For example, the encoder 123 may encode a complex value corresponding to a pixel (x1, y1) to "10 . . . 1", a complex value corresponding to a pixel (x2, y1) to "00 . . . 1 . . . 1", a complex value corresponding to a pixel (x3, y1) to "11 . . . 0", and the other complex values corresponding to remaining pixels to 8-bit unsigned integers. Such 8-bit unsigned integers corresponding to the pixels are values corresponding to pixels in the CGH image 23 (see FIG. 1) of UHD resolution, and may correspond to point holograms in the holographic image 30 (see FIG. 1).

As described above, the processor 120 may transform the input image 21 (see FIG. 1) of low resolution into the CGH image 23 (see FIG. 1) of high resolution at high speed by performing the CGH processing that performs frequency transformation (e.g., FFT) on the pixels of the low resolution. Accordingly, the display 130 may efficiently display the holographic image 30 (see FIG. 1) of high resolution.

FIGS. 9A and 9B are diagrams illustrating scaling a stereo image, according to exemplary embodiments.

Referring to FIG. 9A, the input image may be a side-by-side stereo image 910. The side-by-side stereo image 910 is an image in which a 2D left-eye image 911 and a 2D right-eye image 913 are arranged side-by-side. When the input image is the side-by-side stereo image 910, the scaling operator 122 performs horizontal scaling on the side-by-side stereo image 910. As a result of the horizontal scaling, the side-by-side stereo image 910 is reconstructed as separate images: a 2D left-eye image 910 of low resolution (e.g., FHD) and a 2D right-eye image 925 of low resolution. That is, the scaling operator 122 reconstructs the 2D images 920 and 925 of low resolution from the side-by-side stereo image 910 before the frequency transformation is performed by the frequency transforming operator 121. The frequency transforming operator 121 performs the frequency transformation on the reconstructed 2D images 920 and 925, and CGH processing is performed to generate CGH images 550 and 555 (see FIG. 5) of high resolution (e.g., UHD). Thus, according to an embodiment in which the input image is the side-by-side stereo image, a pre-process, that is, the horizontal scaling, may be performed.

Referring to FIG. 9B, an input image may be a top-bottom stereo image 930. The top-bottom stereo image 930 is an image in which a 2D left-eye image 931 and a 2D right-eye image 933 are vertically arranged. When the input image is the top-bottom stereo image 930, the scaling operator 122 performs vertical scaling on the top-bottom stereo image 930. As a result of the vertical scaling, the top-bottom stereo image 930 is reconstructed as separate images: a 2D left-eye image 940 of low resolution (e.g., FHD) and a 2D right-eye image 945 of low resolution. That is, the scaling operator 122 reconstructs the 2D images 940 and 945 of low resolution from the top-bottom stereo image 930 before frequency transformation is performed by the frequency transforming operator 121. The frequency transforming operator 121 performs the frequency transformation on the reconstructed 2D images 940 and 945, and CGH processing is performed to generate CGH images 550 and 555 (see FIG. 5) of high resolution (e.g., UHD). Thus, according to an exemplary embodiment in which the input image is the top-bottom stereo image 930, a pre-process, that is, the vertical scaling, may be performed.

Figure 10:
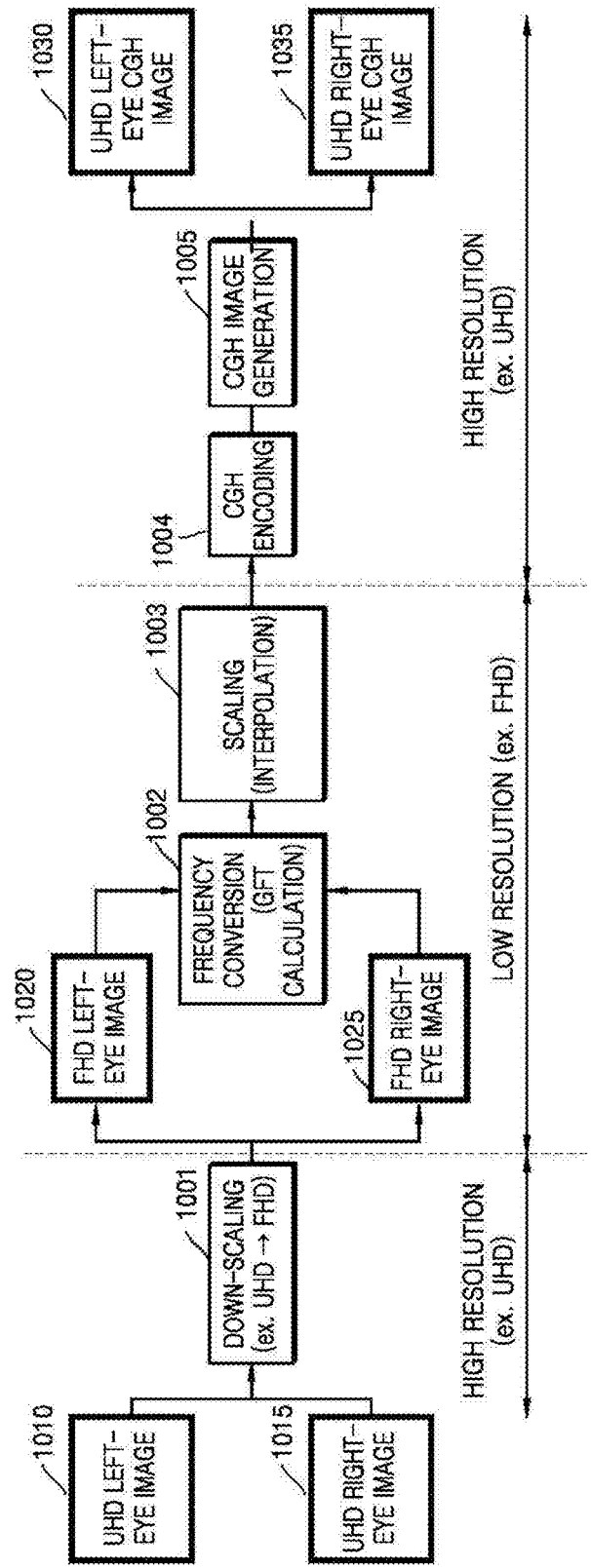
FIG. 10 is a flow diagram illustrating processing of a high resolution image, according to an exemplary embodiment.

FIG. 10 is a flow diagram illustrating processing of a high resolution image according to an exemplary embodiment.

According to the present exemplary embodiment illustrated with reference to FIG. 10, a resolution of an input image and a resolution of a CGH image that is to be generated may be equal to each other.

Unlike the above exemplary embodiments illustrated, a resolution of an input image in the present exemplary embodiment may be a high resolution (e.g., UHD) that is equal to a resolution of a CGH image to be generated.

In operation 1001, the scaling operator 122 down-scales a left-eye image 1010 of high resolution (e.g. UHD) and a right-eye image 1015 of high resolution. That is, the scaling operator 122 may down-scale the high resolution images 1010 and 1015 to a left-eye image 1020 of low resolution (e.g., FHD) and a right-eye image 1025 of low resolution. Here, the scaling operator 122 may down-scale the high resolution images 1010 and 1015 by performing interpolation. As described above, a pre-process, that is, the down-scaling, is performed to reduce an amount of FFT computation and hence GFT computation, performed by the frequency transforming operator 121. Because the number of pixels decreases, the FFT is correspondingly decreased to correspond to the number of pixels, when the resolution is reduced. Thereby, the amount of the FFT computation performed by the frequency transforming operator 121 may be reduced.

Operations 1002, 1003, 1004, and 1005 included in the CGH processing respectively correspond to operations 501, 502, 503, and 504 illustrated in FIG. 5, and thus, redundant descriptions thereof are omitted.

That is, even when the input image includes high resolution images 1010 and 1015, the frequency transformations are performed on the pixels of low resolution (e.g., 1920× 1080), and not on the pixels of the high resolution (e.g., 3840×2160). Therefore, an amount of CGH computation of the processor 120 may be reduced as compared to when frequency transformations are performed on the pixels of high resolution (that is, a case in which the down-scaling is not performed). Accordingly, a computation speed may increase.

Figure 11:
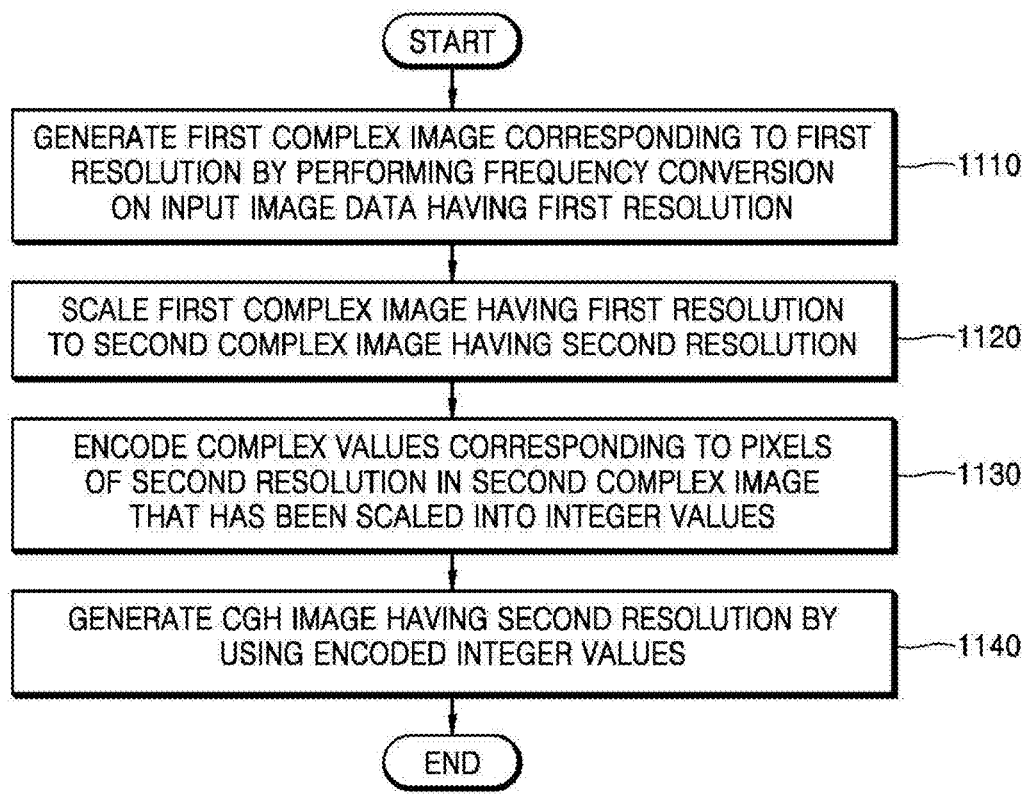
FIG. 11 is a flowchart illustrating a method of processing a holographic image, according to an exemplary embodiment.

FIG. 11 is a flowchart illustrating a method of processing a holographic image according to an exemplary embodiment.

Referring to FIG. 11, the method of processing the holographic image includes the processes that are time-serially performed by the computing device 10 (the processor 120) described with reference to the above-described drawings. Accordingly, the description presented above, though omitted hereinafter, may be applied to the method of processing the holographic image illustrated in FIG. 11.

In operation 1110, the frequency transforming operator 121 performs frequency transformation on input image data having a first resolution (low resolution, e.g., FHD) to generate a low resolution complex image.

In operation 1120, the scaling operator 122 scales the low resolution complex image of first resolution to a high resolution complex image of second resolution (high resolution, e.g., UHD).

In operation 1130, the encoder 123 encodes complex values respectively corresponding to pixels of the second resolution in the second complex image that has been scaled, into integer values.

In operation 1140, the CGH image generator 124 generates a CGH image of the second resolution by using the encoded integer values.

According to the above description, the amount of GFT computation (in particular, FFT) that applies a large load to the CGH processing for generating the CGH image may be reduced, and thus, the CGH processing may be efficiently performed at high speed.

The exemplary embodiments may be written as computer programs and implemented in general-use digital computers that execute the programs using a processor to read and execute the computer programs stored in a non-transitory computer readable recording medium. Examples of the non-transitory computer readable recording medium include magnetic storage media (e.g., ROM, floppy disks, hard disks, etc.), optical recording media (e.g., CD-ROMs, or DVDs), etc.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of processing a holographic image, the method comprising:
   generating a first complex image corresponding to a first resolution by performing frequency transformation on input image data including color data and depth data of each of pixels in a left-eye two-dimensional (2D) image and a right-eye 2D image having the first resolution, the first complex image comprising real component image data of real values corresponding to each pixel in the left-eye (2D) image and the right-eye 2D image of the input image data and imaginary component image data or imaginary values corresponding to each pixel in the left-eye 2D image and the right-eye 2D image of the input image data;
   up-scaling the first complex image having the first resolution to a second complex image having a second resolution, wherein the first resolution is less than the second resolution;
   encoding complex values corresponding respectively to pixels of the second resolution in the second complex image that has been up-scaled, into integer values; and
   generating a computer generated hologram (CGH) image corresponding to each of a left-eye image and a right-eye image having the second resolution by using the encoded integer values;
   displaying the computer generated hologram image corresponding to the left-eye image and the computer generated hologram image corresponding to the right-eye image.

2. The method of claim 1, wherein the generating of the first complex image comprises generating the first complex image by performing frequency transformation of the color data and the depth data of each pixel in the left-eye 2D image and the right-eye 2D image of the input image data into a complex value corresponding to each pixel.

3. The method of claim 1, wherein the frequency transformation comprises generalized Fresnel transformation (GFT), and the generating of the first complex image comprises performing fast Fourier transformation (FFT) on each of the pixels in the left-eye 2D image and the right-eye 2D image of the input image data having the first resolution.

4. The method of claim 1, wherein the up-scaling of the first complex image comprises up-scaling the first complex image of the first resolution to the second complex image of the second resolution by performing interpolation.

5. The method of claim 4, wherein the up-scaling of the first complex image comprises:
   separating the first complex image into a first real image based on the real component image data and a first imaginary image based on the imaginary component image data, corresponding to the first resolution;
   generating a second real image and a second imaginary image corresponding to the second resolution by performing the interpolation respectively on the first real image and the first imaginary image; and
   generating the second complex image by synthesizing the second real image and the second imaginary image with each other.

6. The method of claim 1, wherein the encoding comprises encoding the complex values into 8-bit unsigned integer values.

7. The method of claim 1, when an input image is a stereo image of a side-by-side format or a top-bottom format having the second resolution, further comprising pre-processing the stereo image into a left-eye 2D image and a right-eye 2D image of the first resolution,
   wherein the input image data comprises color data and depth data of pixels in the pre-processed left-eye 2D image and the pre-processed right-eye 2D image of the first resolution.

8. The method of claim 1, when an input image has a third resolution that is greater than the first resolution, further comprising down-scaling the input image having the third resolution into the first resolution,
   wherein the input image data comprises color data and depth data of pixels in the down-scaled input image.

9. A non-transitory computer-readable recording medium having recorded thereon a program, which when executed by a computer, performs the method of claim 1.

10. An apparatus for processing a holographic image, the apparatus comprising:
    a processor configured to implement:
       a frequency transforming operator configured to generate a first complex image corresponding to a first resolution by performing frequency transformation on input image data including color data and depth data of each of pixels in a left-eye two-dimensional (2D) image and a right-eye 2D image having the first resolution, the first complex image comprising real component image data of real values corresponding to each pixel in the left-eye 2D image and the right-eye 2D image of the input image data and imaginary component image data of imaginary values corresponding to each pixel in the left-eye 2D image and the right-eye 2D image of the input image data;

a scaling operator configured to up-scale the first complex image having the first resolution to a second complex image having a second resolution, wherein the first resolution is less than the second resolution;

an encoder configured to encode complex values respectively corresponding to pixels of the second resolution in the up-scaled second complex image, into integer values; and a computer generated hologram (CGH) image generator configured to generate a CGH image corresponding to each of a left-eye image and a right-eye image having the second resolution by using the encoded integer values, wherein the processor is further configured to control a display to display the computer generated hologram image corresponding to the left-eye image and the computer generated hologram image corresponding to the right-eye image.

11. The apparatus of claim 10, wherein the frequency transforming operator generates the first complex image by performing the frequency transformation on the color data and the depth data of the pixels in the left-eye 2D image and the right-eye 2D image of the input image data into complex values corresponding to the pixels.

12. The apparatus of claim 10, wherein the frequency transformation comprises generalized Fresnel transformation, and the frequency transforming operator generates the first complex image by performing fast Fourier transformation (FFT) on each of pixels in the left-eye 2D image and the right-eye 2D image of the input image data having the first resolution.

13. The apparatus of claim 10, wherein the scaling operator up-scales the first complex image of the first resolution to the second complex image of the second resolution by performing interpolation.

14. The apparatus of claim 13, wherein the scaling operator separates the first complex image into a first real image based on the real component image data and a first imaginary image based on the imaginary component image data, corresponding to the first resolution, generates a second real image and a second imaginary image corresponding to the second resolution by performing the interpolation on each of the first real image and the first imaginary image, and generates the second complex image by synthesizing the second real image and the second imaginary image.

15. The apparatus of claim 10, wherein the encoder encodes the complex values into 8-bit unsigned integer values.

16. The apparatus of claim 10, wherein when an input image is a stereo image of a side-by-side format or a top-bottom format having the second resolution, the scaling operator pre-processes the stereo image into a left-eye 2D image and a right-eye 2D image of the first resolution, and the input image data comprises color data and depth data of pixels in the pre-processed left-eye 2D image and the pre-processed right-eye 2D image of the first resolution.

17. The apparatus of claim 10, wherein when an input image has a third resolution that is greater than the first resolution, the scaling operator down-scales the input image having the third resolution into the first resolution, and the input image data comprises color data and depth data of pixels in the down-scaled input image.

18. The apparatus of claim 17, wherein the third resolution is equal to the second resolution.

* * * * *